(12) United States Patent
McLoughlin et al.

(10) Patent No.: US 9,152,998 B2
(45) Date of Patent: *Oct. 6, 2015

(54) INVESTOR RELATIONS SYSTEMS AND METHODS

(71) Applicant: TSX INC., Toronto (CA)

(72) Inventors: Mark C. McLoughlin, Caloundra (AU); Kenneth R. Watson, New York, NY (US); Agnieszka B. Watson, Redmond, WA (US)

(73) Assignee: TSX Inc., Toronto (CA)

( * ) Notice: Subject to any disclaimer, the term of this patent is extended or adjusted under 35 U.S.C. 154(b) by 157 days.

This patent is subject to a terminal disclaimer.

(21) Appl. No.: 13/971,508

(22) Filed: Aug. 20, 2013

(65) Prior Publication Data

US 2013/0346342 A1   Dec. 26, 2013

Related U.S. Application Data

(63) Continuation of application No. 12/793,631, filed on Jun. 3, 2010, now Pat. No. 8,543,590.

(60) Provisional application No. 61/184,607, filed on Jun. 5, 2009.

(51) Int. Cl.
    G06F 17/30    (2006.01)
    G06Q 40/06   (2012.01)
    G06Q 30/02   (2012.01)

(52) U.S. Cl.
    CPC ............ G06Q 40/06 (2013.01); G06F 17/3043 (2013.01); G06F 17/30401 (2013.01); G06F 17/30554 (2013.01); G06Q 30/0205 (2013.01)

(58) Field of Classification Search
    USPC .................. 707/706, 707, 760, 708, 713, 771
    See application file for complete search history.

(56) References Cited

U.S. PATENT DOCUMENTS

| | | | |
|---|---|---|---|
| 5,590,325 A * | 12/1996 | Kolton et al. | 1/1 |
| 6,282,537 B1 * | 8/2001 | Madnick et al. | 707/716 |
| 6,484,162 B1 * | 11/2002 | Edlund et al. | 1/1 |
| 7,627,554 B2 * | 12/2009 | Kruse et al. | 1/1 |
| 7,877,678 B2 * | 1/2011 | Chopin et al. | 715/212 |
| 7,987,176 B2 * | 7/2011 | Latzina et al. | 707/713 |
| 2002/0135567 A1 | 9/2002 | Chan | |
| 2002/0194113 A1 * | 12/2002 | Lof et al. | 705/37 |
| 2003/0105686 A1 * | 6/2003 | Dang et al. | 705/31 |
| 2005/0216497 A1 * | 9/2005 | Kruse et al. | 707/101 |
| 2005/0228987 A1 * | 10/2005 | Wada | 713/156 |
| 2006/0031077 A1 * | 2/2006 | Dalton et al. | 705/1 |

(Continued)

OTHER PUBLICATIONS

Parent U.S. Appl. No. 12/793,631, filed Jun. 3, 2010, entitled "Investor Relations Systems and Methods"—issued as U.S. Pat. No. 8543590 on Sep. 24, 2013; Inventors: McLoughlin et al.

(Continued)

*Primary Examiner* — Cam-Linh Nguyen
(74) *Attorney, Agent, or Firm* — Perry + Currier Inc.

(57) ABSTRACT

Techniques to automate the management of investor relations are disclosed herein. A vertical domain query language is introduced, specifically for investor relations. Graphical query builder tools to create queries in the vertical domain query language are described. Reports specific to investor relations, in particular reports to assess the efficacy of investor relations activities, are also described. Investor relations client applications that make use of user state, such as identity, date time stamp and geolocation are described.

7 Claims, 16 Drawing Sheets

(56) References Cited

U.S. PATENT DOCUMENTS

| | | | |
|---|---|---|---|
| 2006/0161544 | A1 | 7/2006 | Lee et al. |
| 2006/0233342 | A1* | 10/2006 | Thione et al. ............ 379/221.09 |
| 2007/0050698 | A1* | 3/2007 | Chopin et al. ................ 715/503 |
| 2007/0050702 | A1* | 3/2007 | Chopin et al. ................ 715/507 |
| 2007/0078676 | A1* | 4/2007 | Hamer et al. ..................... 705/1 |
| 2007/0264969 | A1* | 11/2007 | Frank et al. ................ 455/404.2 |
| 2009/0106077 | A1* | 4/2009 | Bhogal et al. ...................... 705/9 |
| 2009/0182645 | A1* | 7/2009 | Polan et al. ...................... 705/26 |
| 2009/0192783 | A1* | 7/2009 | Jurach et al. ....................... 704/4 |
| 2010/0004975 | A1* | 1/2010 | White et al. ..................... 705/10 |

OTHER PUBLICATIONS

Godfrey P et al: "Answering Queries by Semantic Caches", Lecture Notes in Computer Science/Computational Science(EUROCRYPT)CHES 2008, Springer, DE, vol. 1677, Jan. 1, 1999, pp. 485-498, XP002299758, DOI: 10.1 007/3-540-48309-8_45, ISBN: 978-3-540-24128-7.

Cimiano et al: "Towards portable natural language interfaces to knowledge bases—The case of the ORAKEL system", Data & Knowledge Engineering, Elsevier BV, NL, vol. 65, No. 2, Nov. 22, 2007, pp. 325-354, XP022572041, ISSN: 0169-023X.

I Androutsopoulos et al: "Natural Language Interfaces to Databases—An Introduction", Journal of Natural Language Engineering, Mar. 16, 1995, XP055127791, Retrieved from the Internet: URL:http:/lpdf.aminer.org/000/815/187/Natural_language_interfaces_to_databases_an_introduction.pdf [retrieved on Jul. 9, 2014].

Corresponding European Patent Application No. 10784187.6, Extended European Search Report, Jul. 17, 2014.

Corresponding Canadian Patent Application No. 2763785, Examination Report, Sep. 26, 2014.

* cited by examiner

INVESTOR RELATIONS SYSTEMS AND METHODS

RELATED APPLICATIONS

This patent application claims priority to provisional U.S. Patent Application No. 61/184,607 filed on Jun. 5, 2009, which is herein incorporated by reference.

BACKGROUND

Companies fund operations from capital obtained from investors. If a company fails to satisfy its investors, the company becomes at risk of having investors withdraw their investments, the company losing valuation, and the company not having enough capital to fund operations.

Investor relations is the practice of managing all aspects of a relationship with investors including, but not limited to communications with investors via activities and events, measuring the effect of those communications by monitoring investor holding positions, evaluating the measured results and planning future activities and events. An investor relations officer ("IRO") is an individual who performs investor relations.

In large companies and publicly traded companies, the number of investors, and the complexity of the relationships with investors, in particular with institutional investors, have given rise to the need of bringing modern project management and customer relations management ("CRM") techniques to bear in investor relations, as well as advanced analysis techniques made possible with present advances in computing. Accordingly, those techniques are reliant on automation.

SUMMARY

Disclosed herein are techniques for automating investor relations operations. The disclosed techniques include, but are not limited to, providing: (1) a query language specific to the semantics of investor relations, (2) tools to obtain investor relations reports and perform analysis on investor relations data, and (3) services specific to investor relations.

While queries against data stores are presently performed using a non-vertical domain specific data retrieval language, disclosed herein is a query language that incorporates terms and semantics of investor relations. This investor relations query language is then converted to a general data retrieval language such as structured query language ("SQL"). Accordingly, non-technical IROs may perform queries in terms of investment relations without learning a general data retrieval language. Furthermore, because the investor relations query language incorporates semantics of investor relations, the generated general data retrieval language query may be expanded via soft expressions. For example, a query for investors that are "like" a particular investor, or a query for stocks that are "like" a particular stock may be precisely generated because knowledge that a query is an investor relations query can import the identity of filters and parameters that could not have been inferred otherwise.

Also disclosed herein is a client side toolset to support investor relations. The toolset includes, but is not limited to a workbench that generates queries against a data store utilizing the investor relations query language. Also included is a report generator that allows an IRO to review investor relations data including, but not limited to, targeted investor data, investor communications event data and investor holdings data. Regarding investor communications event data, disclosed herein are novel reports that illustrate and measure the impact of those investor communications events.

Corresponding to the client side toolset, disclosed herein is a set of investor relations services. For example, disclosed herein is an investor invitation management system. Specifically, where an investor communications event is planned, individual representatives of investors are contacted and an RSVP system where investors may designate substitute representatives is provided.

BRIEF DESCRIPTION OF THE DRAWINGS

Non-limiting and non-exhaustive examples are described with reference to the following figures. In the figures, the left-most digit(s) of a reference number identifies the Figure in which the reference number first appears. The use of the same reference numbers in different figures indicates similar or identical items or features.

DETAILED DESCRIPTION

Overview of Investor Relations

Figure 1:
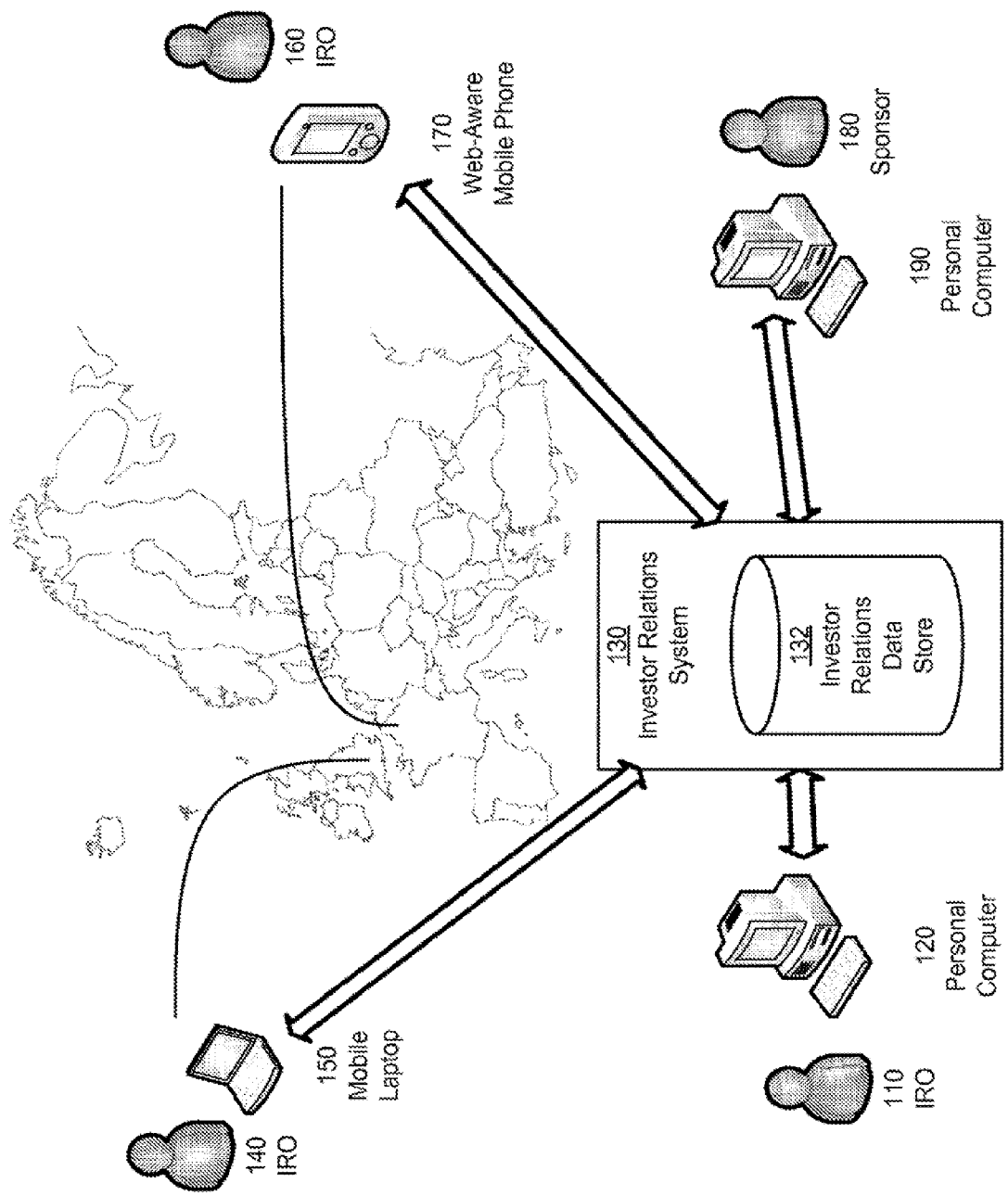
FIG. 1 is a top level diagram of an exemplary operation of an investor relations system.

Described herein are systems and methods to automate investor relations. Specifically, described herein are systems and methods to automate investment relations management including, but not limited to, investor communications events ("events"), investor relations officer ("IRO") activities ("activities"), targeted investors ("targets"), investor CRM, investment relations reporting and investment relations data analysis. FIG. 1 illustrates these concepts in top level diagram 100.

IROs concern themselves with how investors perceive the stock and assets of their clients. In the case of publicly traded companies, IROs cannot possibly personally manage all investors. Accordingly, while IROs will manage investor relations at all levels, IROs will prioritize directed communications events to large holders, institutional investors or investment blocs. Specifically. IROs will organize, schedule and perform events where investors and investment managers may obtain information about an IRO's company.

A canonical example of an investment bloc is an institutional investor or a mutual fund. By virtue of being organized under a financial institution, the investment moneys may be conceptually grouped by that company. However, the presently disclosed investment relations system is not to be limited strictly to institutional investors. Rather the technique described herein may also be applied to an arbitrary investment bloc. One example would be retail investors in a geographic location. Accordingly, one might characterize all investors over the age of 65 in the state of Florida as an investment bloc. Another example would be the set of individual investors who hold over 5% of a company and under Securities Exchange Commission ("SEC") rules would be obliged to register as company stakeholders. In this way, the investor relations system allows an IRO to manage relations with non-institutional investors as well. For purposes of this disclosure, discussions applicable to institutions are also applicable to investment blocs.

An IRO 110 via a client such as a personal computer 120, will access investor relations system 130. For example, from a home page. IRO 110 may view pending action items/activities, view the holdings positions of major investors, and identify anomalies. IRO 110 might then perform some ad hoc queries against investor relations system 130 to identify opportunities, risks or problems.

Investor relations system 130 contains an investor relations data store 132. Investor relations data store 132 is not necessarily limited strictly to investor relations data. For example, it may store CRM data and holdings data. Investor relations data store 132 need not physically store the data itself. Alternatively, investor relations data store 132 might store references to data in third party data stores. Potentially investor relations data store 132 might store references to internet hosted information, such as postings in a web forum or social network.

Figure 2:
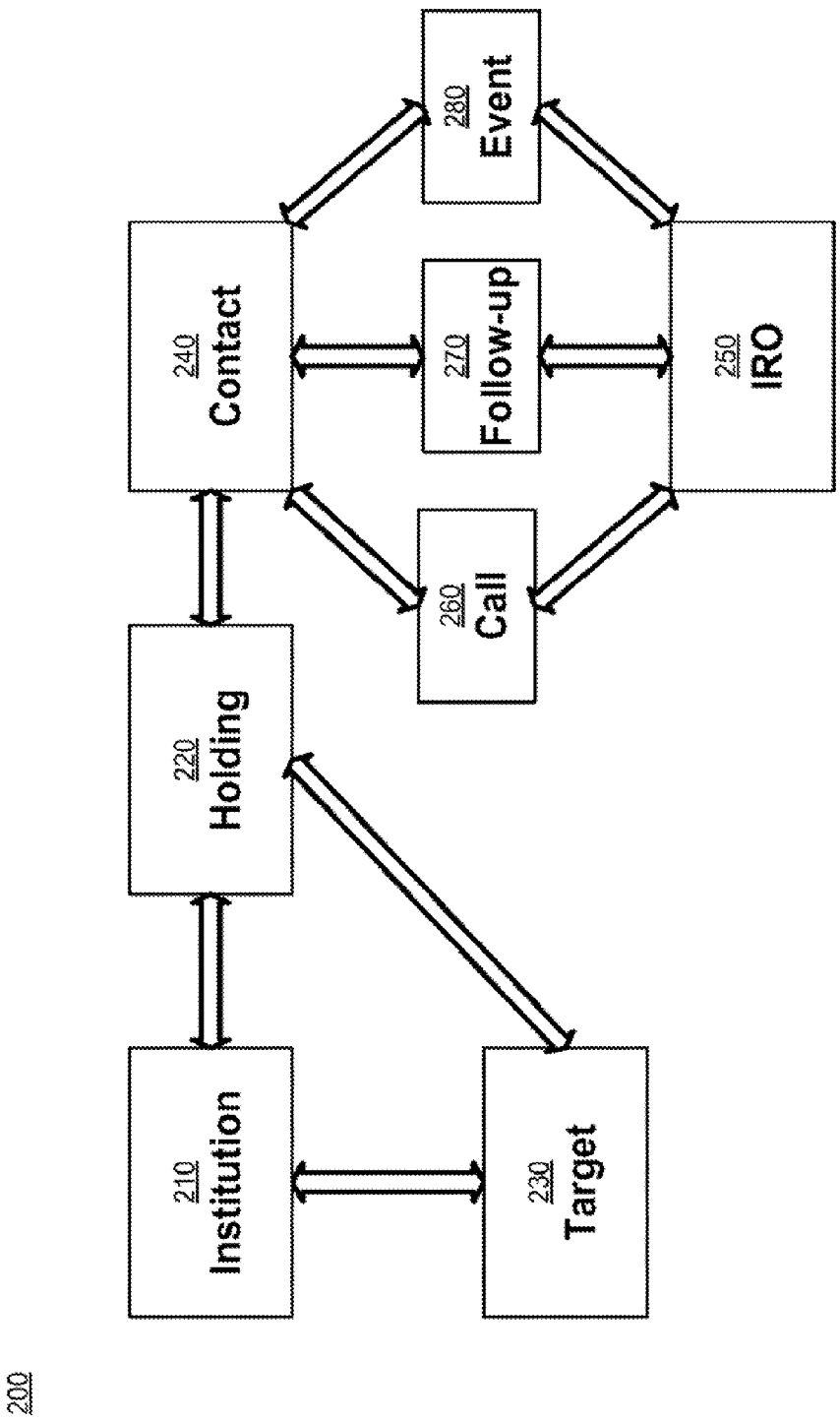
FIG. 2 is an exemplary schema of the data managed by an investor relations system.

FIG. 2 shows an exemplary schema 200 to illustrate the disparate data that the investor relations data store 132 might hold. Assuming investor relations data store 132 is focused on institutional investors, there might be an institution entity 210. Institution 210 might have an investment holding 220 of a company of interest to an IRO. Based at least on this data, an IRO might draw up a "target list" or list of institutions to communicate information with regards to their holdings. A particular holding may have been managed by a particular investment manager at the institution. That particular investment manager, or institutional representative, might be stored in a contact entity 240. In order for a particular IRO 250 to change the holding, the IRO 250 would plan several activities with the contact 240. For example, the IRO 250 might directly call contact 240 and store the notes of that contact in call entity 260. The IRO 250 might take away some action items, such as providing additional information. The IRO 250 might also take away feedback on the contacts opinion as to the future stock performance of the company. The information about the performance of these action items or the reception of feedback from a contact might be stored in a follow-up entity 270. A particularly large action item might be to organize a communications event 280 to one or more contacts. An event 280 might include related activities such as scheduling the presence of the CEO and CFO of a company, creating press releases, and coordinating with regulatory bodies. Thus activities are not limited to calls, follow-ups and events, but include any activity that an IRO might perform to manage an investment relation.

As can be seen in FIG. 2, not only is investment data potentially stored in investor relations data store 132, but also holdings data 220 and CRM data in the contact 240. IRO 250, call 260, follow-up 270 and event 280 entities. Additional entities may be added to support additional functionality as desired. Cross references to other databases may be added to integrate with other applications.

Data stored in investor relations data store 132 may originate as data entry from IROs and data entry clerks. However, much of the operational data may be imported from third parties. Examples are holdings data imported from 13F reports from FactSet Research Systems Inc. ("FactSet"), or investment data from Morningstar, Inc ("Morningstar"). The data may be stored to enable overlaying in queries to check for correlations. For example, a widget might display the FactSet in a first color, the Morningstar data in a second color. As a third layer, events input by IROs might then be overlaid as points on the display. A fourth layer might be data that tracked news sentiment, i.e. whether or not news articles were reporting favorably on a company.

Turning back to FIG. 1, after reviewing investor relations data via investor relations system 130, an IRO may identify contacts to target based in London and Paris and accordingly may schedule activities to perform. These activities might include a personal call, but might also involve a personal visit, with or without executive support. A different IRO 140 might go on a trip to London and via a client such as a mobile laptop 150, might access investor relations system 130 to identify activities specific to the target. Upon performing those activities, IRO 140 might provide status to investor relations system 130.

On the way to Paris, IRO 160 (who may be the same or different as IRO 140) might access investor relations system 130 via a mobile phone client 170. Mobile phone client 170 might store user state information such as user identity (in this case the identity of IRO 160), a date time stamp, and the geolocation of the user. This user state information would enable a class of applications that automatically determines what information is immediately needed. For example, from this user state information, the investor relations system 130, or an application running on mobile phone client 170 might be able to infer that IRO 160 is about to go to an event in Paris, and would be able to automatically retrieve CRM information of contacts in Paris. Alternatively, if IRO 160 is on the road, the investor relations system 130, or an application running on mobile phone client 170 might be able to retrieve directions to the event. Similar to the netbook scenario, the IRO 160 might enter status of activities via mobile phone client 170. The status may be augmented via text data, potentially entered via a mobile device and transmitted via short message service ("SMS"), over the Internet or over an alternative data transport.

At any point in time, a sponsor 180 of the investor relations activities, such as the CFO of the company whose investors are being contacted, might wish to assess the impact of those investor relations activities. Sponsor 180 might then access the investor relations system 130 via a client such as a personal computer 190, and view reports that correlated investment relations activity with positive changes in investor holdings.

Vertical Domains and Investor Relations Queries

In order to effectively identify and prioritize contacts to target, an IRO must be able to mine investor relations data for non-trivial opportunities, risks or problems in the investment holding and contact CRM data. In particular, an IRO must be able to effectively mine data stored in investor relations system 130 and in particular in investor relations data store 132. In the past, data access comprised providing users with the choice of learning a complex general data retrieval language such as structured query language ("SQL"), or providing a graphical user interface that was easier to use but limited queries that could be expressed. However, because most users were non-technical users, learning a general data retrieval language was not an accessible option. Conversely, because the graphical user interface limited the queries that could be expressed, the tool commensurately limited the complexity of issues that a user could identify. For complex reports, often a user would have to submit a request to their information technology ("IT") department with uncertain turnaround.

The present disclosure inserts a domain specific intermediate language between the graphical user interface and general data retrieval language layers. Alternatively, the general data retrieval language might be replaced by a domain specific intermediate language. In either alternative, end users may create queries using the semantics of their vertical domain. Because end users are familiar with the semantics of their vertical domain, they may create more complex queries than before, and correspondingly identify more subtle issues.

A domain specific intermediate language is a query language whose terms and primitives include concepts specific to a particular vertical domain. For example, a human resources language might have terms for employee and employer. An investor relations intermediate language might have terms for investor and holding.

One way for an intermediate language to be domain specific is to have domain specific terms or primitives directly supported by a parser for a language. For example, an investor relations intermediate language might have terms for "fund", "stock" and "holding" directly expressed in the Backus-Naur Form ("BNF") of the language itself. An example investor relations intermediate language BNF is provided in the Appendix at the end of this specification.

Alternatively, domain specific terms or primitives might be accessible via a library. However, the terms should support relation operations specific to the vertical domain. For example, a general data retrieval language might support the general concept of weighting. But an investor relations intermediate language might have a weight predicate list semantically limited to stock predicates and other predicates tied to investor relations concepts. Thus even if a domain specific retrieval language is built upon a general data retrieval language which might support weighting in general, the domain specific objects would limit what objects could be applied (e.g. limiting weighting to stock predicates) via strong type checking and other language techniques.

An example of a investor relations domain specific intermediate language query might be as follows:
    for (top 10 holders of GOOG)
    which are not holders of MSFT
    get holding of MSFT
    with weighting over S&P500, Tech Sector compared to market In this example, the term "holders" might be a reserved keyword in the investor relations domain specific intermediate language. Here, "holders" is a concept understood by an IRO. Furthermore, the additive "with" clause "weighting over S&P500 compared to market", encapsulates the algorithm on how to distribute weights as well as incorporates a predicate expression "compared to market" in terms that an IRO readily understands.

Accordingly, from the above example, an IRO might be querying for potential target contacts to invest in Microsoft based on whether the potential target owns Google when normalized against the S&P500 tech sector. Because the concepts in the query language itself use the terms and semantics of investor relations, the IRO may construct queries in terms of investor relations concepts rather than data retrieval concepts.

The example query above makes use of top 10 clause to retrieve the ten largest holders of Google subject to a filter. In investment relations, this is a typical query since IROs are often most interested in the largest holders in order to prioritize efforts. However, not all queries will focus on the largest amounts. For example, a query might cross reference events against institutions or contacts. In this case, it would be of interest if a particular institution or contact had not been associated with any events. For queries known to require detecting null conditions, an investor relations specific language might implement joins as outer joins.

Note that different vertical domains might intersect. For example, the investor relations domain might benefit from CRM terms and from investor holdings terms. Thus a domain specific intermediate language might operate to include terms from a set of related domains. The terms could be selectively enabled and disabled depending on the query by selecting different parsers, or alternatively by selecting or including different libraries.

Figure 3:
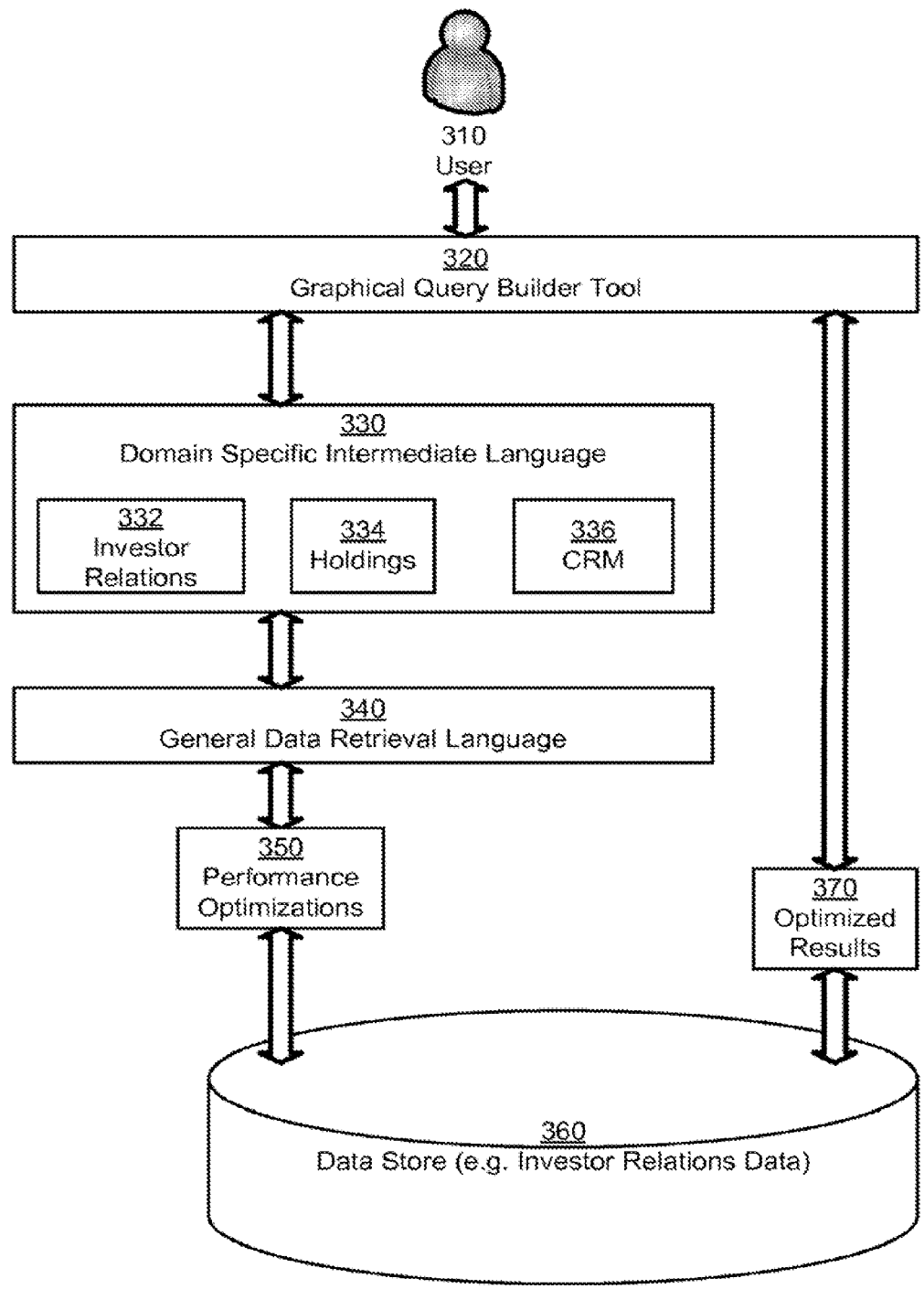
FIG. 3 is a block diagram of an exemplary operation of a query using a domain specific intermediate language.
Figure 4:
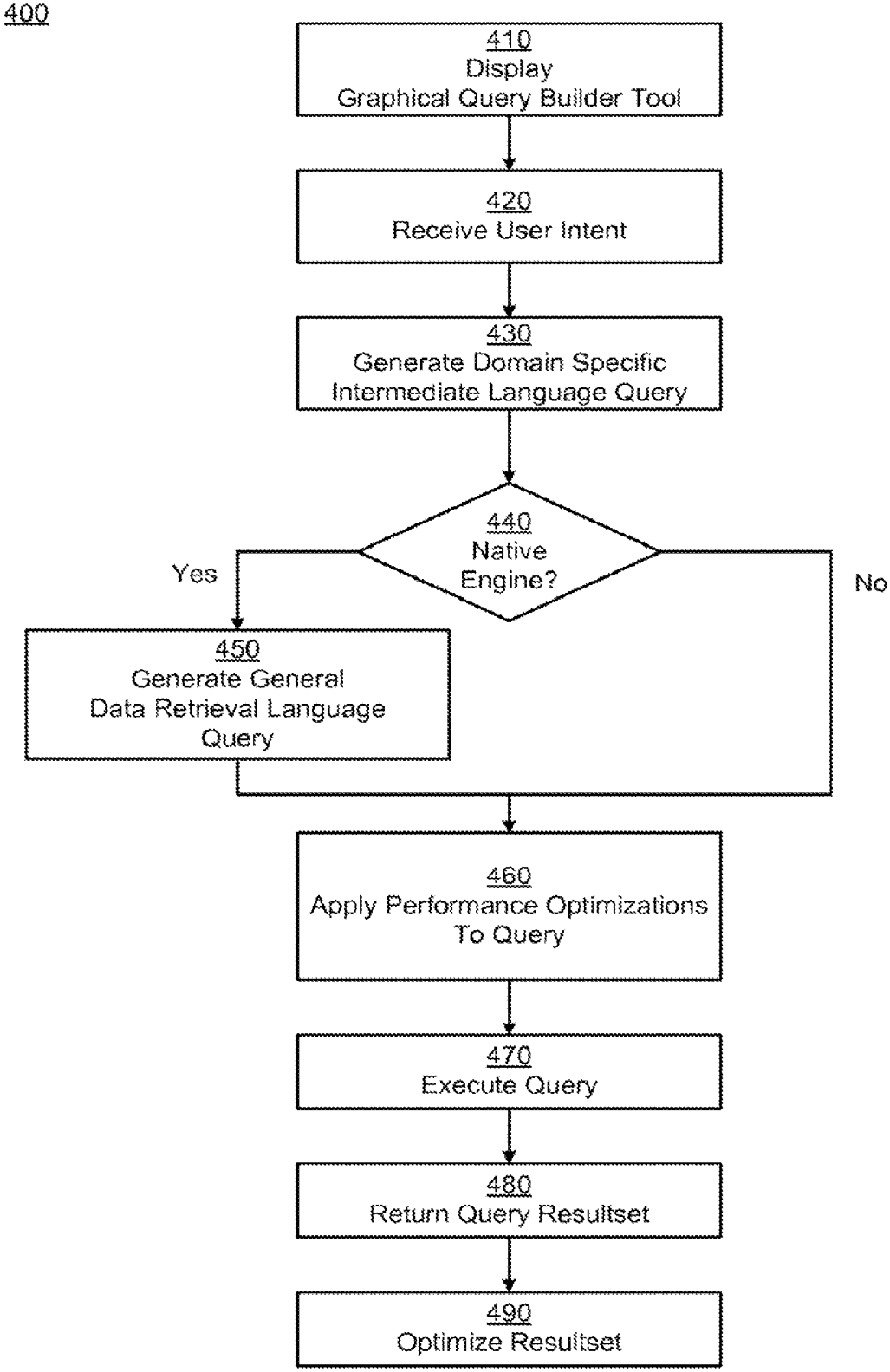
FIG. 4 is a flow chart of an exemplary operation of a query using a domain specific intermediate language.

Thus, a graphical user tool then operates to ensure that the correct arguments are used in the language e.g. MSFT rather than "Microsoft" rather than to limit the expressions a user might make. FIG. 3 provides an exemplary block diagram 300 of the query flow. FIG. 4 provides a corresponding flow chart 400 of the query flow.

A user 310, typically an IRO but possibly a sponsor or other user, accesses a graphical query builder tool 320 to generate a query. FIGS. 5, 6, 7, 8 and 9 as described below illustrate an exemplary graphical query builder tool. Specifically, user 310 makes several selections in the query builder tool 320 to express a user's intent for a query. In terms of FIG. 4, a graphical query builder tool is displayed to the user 410 and receives a user's intent for a query via selections in the graphical query builder tool 420. The selections may be from clickable widgets including, but not limited to drop down boxes, combo boxes, radio buttons, check boxes and buttons.

The query builder tool 320 then creates a query expressed in a domain specific intermediate language. In terms of FIG. 4, a query in a domain specific intermediate language is generated 430. In FIG. 3, the domain specific intermediate language includes terms for investor relations 332, investor holdings 334 and CRM 336.

Once the domain specific intermediate language has been generated, it may be converted into a general data retrieval language such as SQL 340 and the SQL operated against data store 360. Alternatively, the domain specific intermediate language might operate directly against data store 360. An example of direct operation is where an OLE DB™ provider has been implemented to parse the domain specific intermediate language against a third party data store. Another example of direct operation is to write a custom data engine where the persistence layer is natively accessed with the domain specific intermediate language.

FIG. 4 illustrates the decision 440 on whether a general data retrieval language query is generated. If the data engine supports a native execution of the domain specific intermediate language, a general data retrieval language query is generated in 450. Otherwise, step 450 is bypassed.

Depending on the data engine used, there are opportunities to introduce performance optimizations 350 to speed retrieval of data from data store 360. Similarly, upon returning a resultset, there are opportunities to introduce performance optimizations 370 to speed consumption of a query resultset. In terms of FIG. 4, performance optimizations might be applied 460 prior to executing a query, the query then executed 470, a resultset generated and returned 480 and then optimizations applied to the generated resultset post-query 490.

One example of pre-query optimization is to implement a most recently used cache of query results. Specifically, when receiving a query, the optimizer checks the cache to see if the query has been previously executed. If it has, it retrieves the previous results from cache and returns the results as a resultset. Otherwise, it executes the query against the data store 360, and stores the results in cache displacing the least recently used results. There are many variations on caching that may be brought to bear, including hashing the query to identify the cached results, on the fly compression, and replacing most recently used with round robin.

An example of introducing performance optimizations 370 to speed consumption of a query resultset post-query is to compress, hash or index the resultset. Another post-query optimization might be to return a resultset and incrementally load or display the resultset based on the portion of the resultset most likely to be of interest. For example, in a graphical widget that shows result data over time, the widget might display the data of the current year first, and then display the previous year, and then display the data of the year previous to that. Since IRAs are more likely to look at current data first, by incrementally loading data, a user can start looking at data without waiting for a large resultset to fully load.

Figure 5:
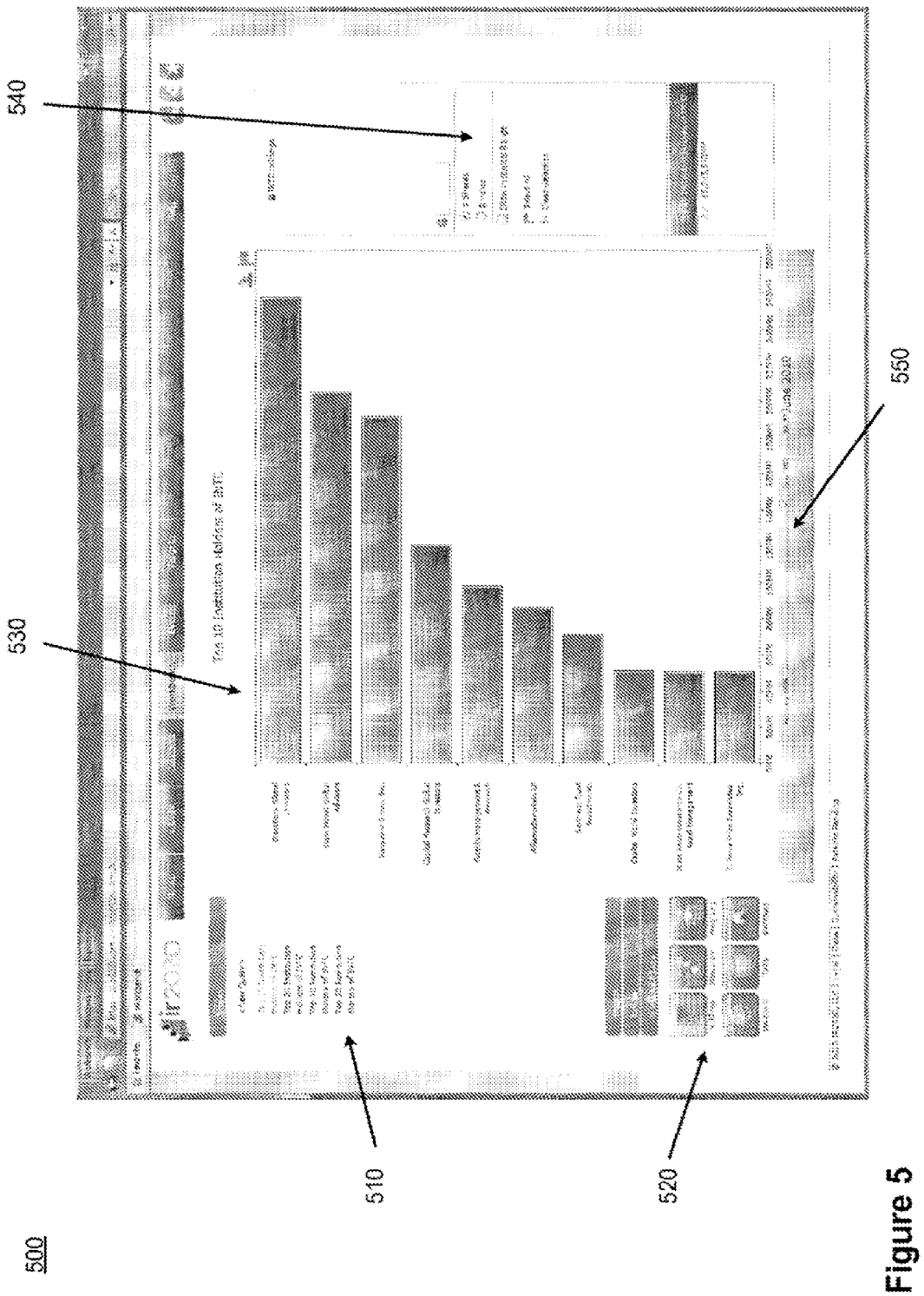
FIG. 5 illustrates an exemplary user interface for a workbench.

FIG. 5 illustrates an exemplary workbench tool 500. A query may be built, and then saved to query list 510. Query list includes custom queries, target lists, event lists and other predefined lists created via a query builder either from query results or by hand.

Figure 6:
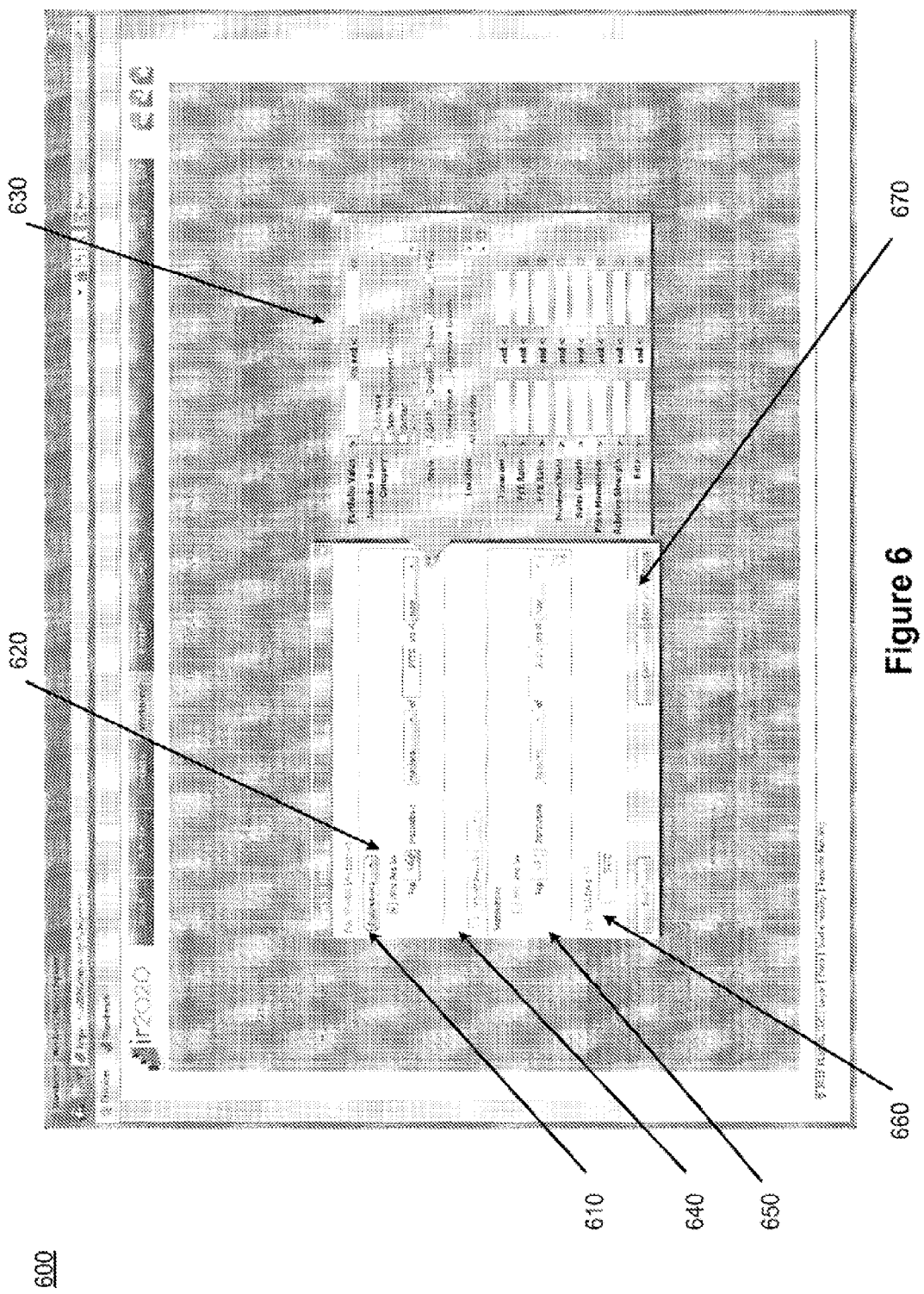
FIG. 6 illustrates an exemplary user interface for a query builder
Figure 7:
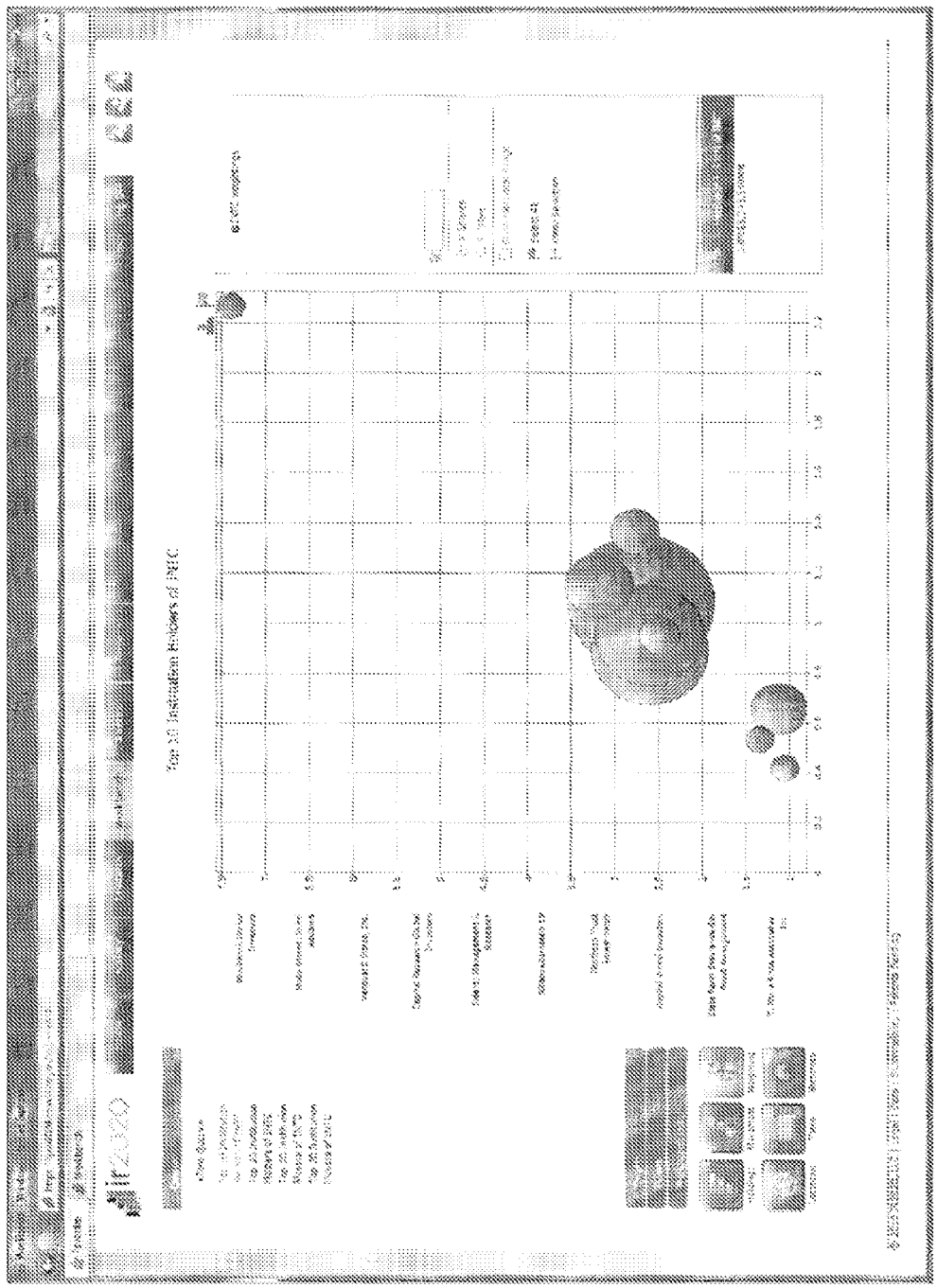
FIG. 7 illustrates a sample weighting report.
Figure 8:
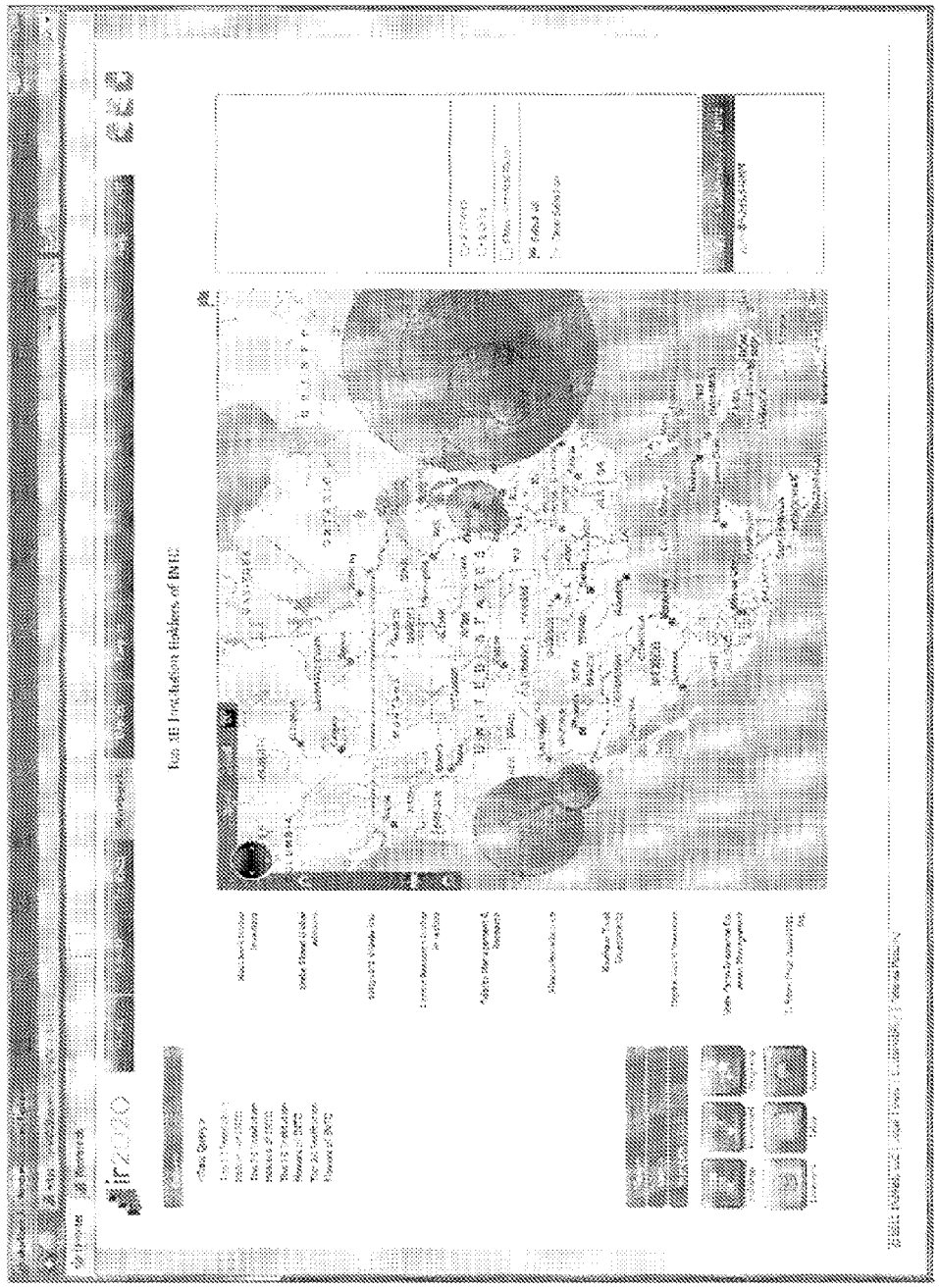
FIG. 8 illustrates a sample location report.
Figure 9:
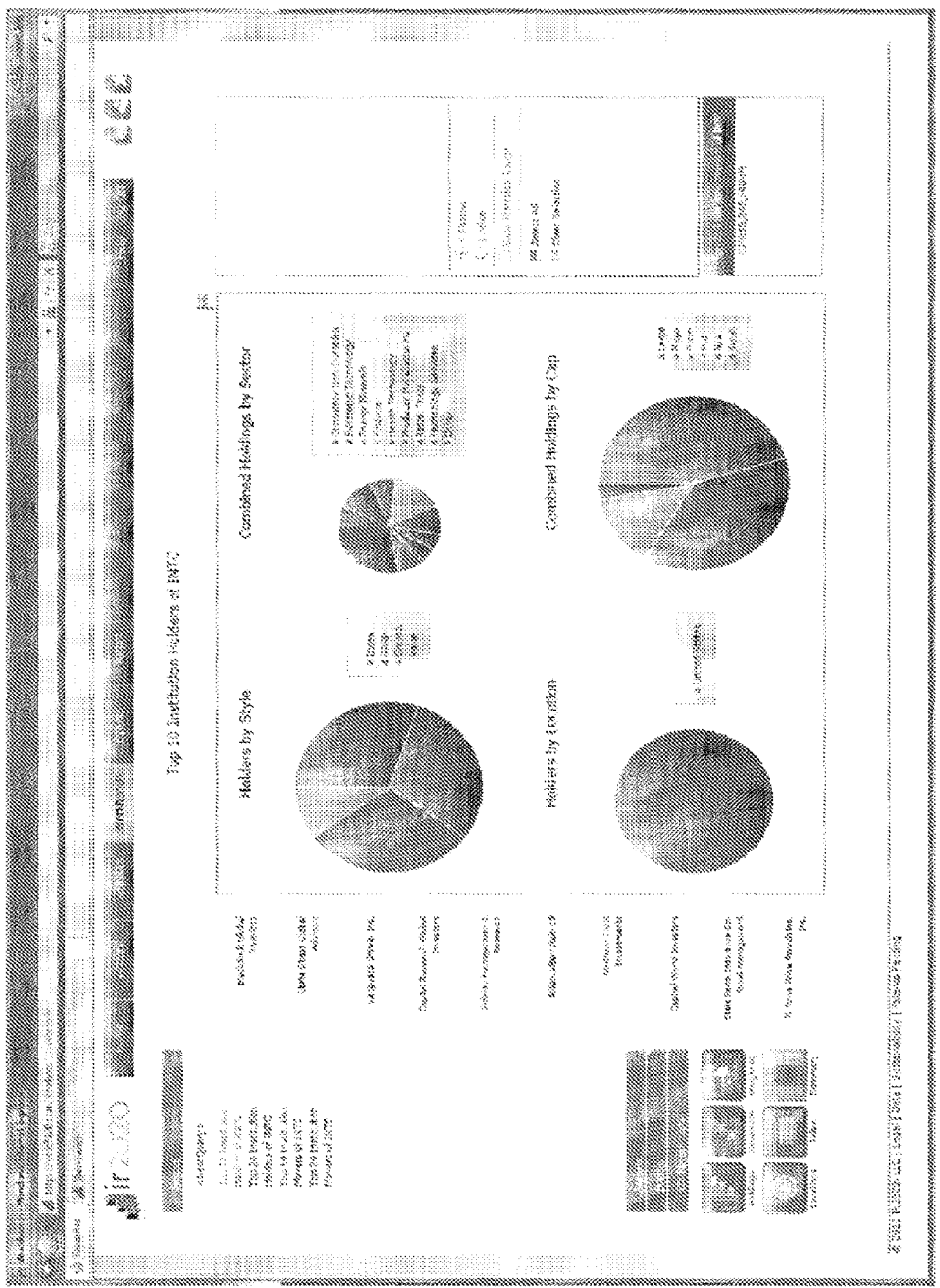
FIG. 9 illustrates a sample holdings summary report.

The query builder is described with respect to FIG. 6. When a new query is to be built, query the workbench displays query builder 600. First an IRO will select whether to search for institutions or mutual funds chosen from a drop down box 610. The institution or fund may be filtered by selecting a check box 620 that enables adding filters. The filter may select a top N institutions or funds and may specify holdings over a date range.

More complex filters may be specified in a filter pop up dialog box 630. In the filter dialog box 630, ranges for values may be set including, but not limited to portfolio value, turnover, P/E ratio, P/B ratio, dividend yield, sales growth, price momentum, relative strength and beta. Filler dialog box 630 also allows a user to choose a one or more values for a field via check boxes of enumerated discrete values. Examples include, but are not limited to, investor, style. Filter dialog box 630 also allows a single value for a field via enumerated lists, for example a list of locations. By virtue of pre-populating options in the filter dialog box 630, the potential for a user to enter incorrect values is reduced.

A second filter may be specified via by enabling a relational clause drop down box 640 and entering filter parameters in filter fields 650. The company whose holdings are of interest may be entered in text box 660. Upon filling out the query fields, clicking on the Save and Execute button 670 will save and execute the query and associate the retrieved resultset with a name.

Returning to FIG. 5, once a user has selected an existing saved query resultset or has built and executed a new query, a predefined visualization 520 for a query may be selected. Here options include, but are not limited to, a holding bar chart, a movement bar chart, a weighting bubble chart 700 (see FIG. 7), a geographic map of showing the density of activities and targets by location 800 (see FIG. 8), a tabular data report, and a summary report comprising pie charts of holding data 900 (see FIG. 9). When rendered, the selected chart 530 can be displayed. Here, holding bar chart data is displayed. The data underlying the chart may be manipulated using controls 540. At the bottom of 540, the name of the underlying query is presented. Additional companies may be added to the display via a text box for peer or competitive analysis. Share count and dollar valuation data may be toggled via radio buttons. Historical ranges may be superimposed over the bar chart by selecting the historical range check box. The selected chart 530 itself may have controls 550 to manipulate the presented data. Here, 550 is a time slider bar that changes the data displayed according to the desired time series.

Figure 10:
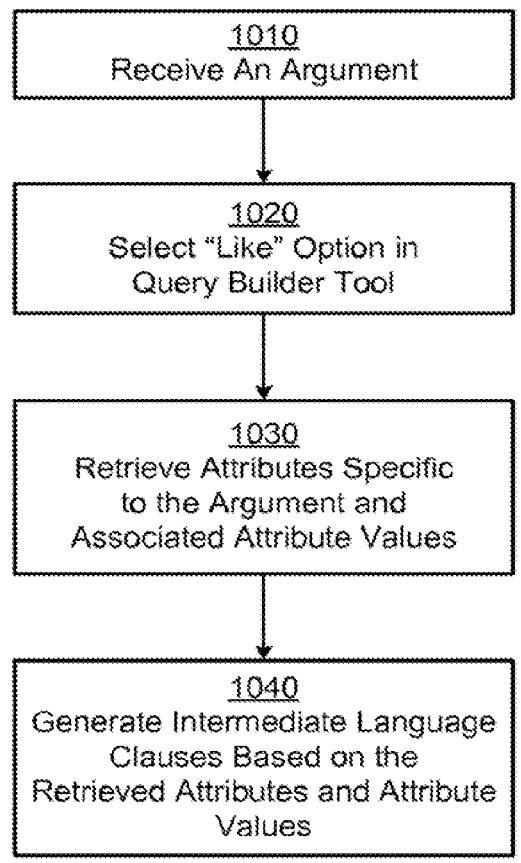
FIG. 10 is a flow chart of an exemplary operation of a soft query.

The query builder tool may support soft expressions. For example, a query for investors that are "like" a particular investor, or a query for stocks that are "like" a particular stock may be generated by importing the identity of filters and parameters known to be associated with that investor or stock. FIG. 10 shows an exemplary flow chart relating to soft expressions.

In step 1010, the query builder tool may receive a filter for a particular argument. For example, a user may specify a filter for institutional holders of stock substantially similar to Intel stock. In the query builder tool, in step 1020 a user may invoke a "like" option, such as by clicking on a "like" button associated with the stock argument for the filter, in this case the value "Intel". In step 1030 the investment relations system will then determine that Intel is a stock object and then identify attributes and attribute values associated with the stock. For example Intel may have a profit/earnings ratio ("P/E") of 20. In 1040, the query builder tool will then generate intermediate language clauses with corresponding attribute values. For example, the query builder tool might additional filter on all institutions whose holdings are substantially similar to or substantially average to a P/E of 20. Specifically, a substantial match may be a value within a range of values calculated from some percentage or standard deviation from the attribute value. Thus a filter that initially retrieved a top ten list of institutions holding Intel would now be refined to a top ten list of institutions whose P/E average is substantially close to 20 as well as holding Intel.

A key feature of a workbench is the ability to insert a list of items into workflow. A list of items may be the returned resultset upon executing a query. Alternatively, a list of items may be a static, predetermined list. A list, regardless if it originated from a query or if it originated from a predetermined list may be edited afterwards. Edit operations include, but are not limited to adding items to a list, deleting items from the list, or potentially editing existing values in the list. A list may be subjected to set operations with respect to another list. For example, a list may be generated as the union of two lists, as the intersection of two lists, as the difference of two lists, or as the convex hull of two lists. From a set operations perspective, a negative set operation, "NOT" may be applied to a list, e.g. items in list A and not in list B.

A list of items may be associated with a particular instance of a workflow type. A workflow type is an operation type to be performed on a list. An instance of a workflow type is the state associated with a particular operation. In the case of investor relations, list would be lists either of institutions or of contacts. Accordingly, workflow types for investor relations would therefore be operations on institutions or of contacts. Example workflow types for investor relations include, but are not limited to, associating a list of institutions or contacts with an event, adding a list of institutions or contacts to a target list, adding the list of institutions or contacts to a particular e-mail distribution, persisting the list, or association the institutions or contacts with a custom action.

In contrast to prior workflow operations, the list of items are associated with a particular instance of workflow type. In other words, when a list of contacts are associated to an event, all the contacts would be invited to the same event, as opposed to different discrete events specific to a contact. When a list of contacts are added to an e-mail distribution list, all the contacts are added to the same e-mail distribution list, not to different e-mail distribution lists.

A special workflow type instance is to support data analysis with by supporting the application of different views to lists and different controllers specific to a particular views. Specifically, a view may have a renderable attribute such as color of a bar graph in a bar graph view, or the overlay of series data.

As described above, FIGS. 5, 7, 8 and 9 all are different views on a list. The time slider control 550 is an example of a control on a view that modifies the time series of data as a renderable attribute. The location view 800 of FIG. 8 might have the color of the data bubbles changed as renderable attribute. Alternatively, a control might allow a user to toggling between having data bubbles represent size of holding versus size of movement.

Exemplary Investor Relations Reports

Once a query resultset is generated, the resultset may be formatted into a report. The report may be displayed on a web page, may be controlled as a graphical user interface widget, or alternatively may be stored as a standalone office electronic document. In particular, views may be persisted as an office electronic document and exported.

Example office electronic documents include, but are not limited to, word processing documents, spreadsheets, presentation graphics, and multi-media. For example, the Microsoft suite of information worker tools known as Office™ is automatable via COM and .NET™ interfaces and accordingly may be invoked programmatically. Accordingly, Microsoft Office™ electronic document files may be generated via accessing interfaces programmatically, for instance via ASP.NET. By way of another example, information work tool suites with open file formats including, but not limited to OpenOffice and Adobe Acrobat™ allow for the generation of compatible office electronic documents directly. FIGS. 11, 12, 13, 14 and 15 illustrate exemplary user interfaces to access investor relations reporting functions. Specifically, 1100 relates to a home page, 1200 relates to a target summary page, 1300 relates to an event summary page, 1400 relates to a contacts query page and 1500 relates to an activity query page.

a. Home Page

In a web embodiment of an investor relations system, a home page provides a starting point for an IRO. An IRO is presented with functions to manage tasks and functions to manage targets.

For task management, a home page might provide an action item/activity docket that enumerates pending or completed activities and their respective statuses. Activities may be filtered by action item type such as call, follow-up, event or target. Activities may be managed in more detail from an activity user interface described below.

Tasks may be integrated with office productivity software. For example, a scheduled task may be integrated with personal calendaring software. Thus a task scheduled in the investment relations system might also be scheduled in the personal calendaring software. In this way, an alert may be triggered to remind the IRO of a pending task even if the investor relations system is not open. Note that any scheduled item, such as an event, may be similarly integrated.

For target management, a home page might display the list of top holders for a company or a list of the most active movers for a company. Based on this information, an IRO may determine if a holder or mover should be added to a target list for additional communication regarding the company. Targets may be managed in more detail from a target user interface described below.

Figure 11:
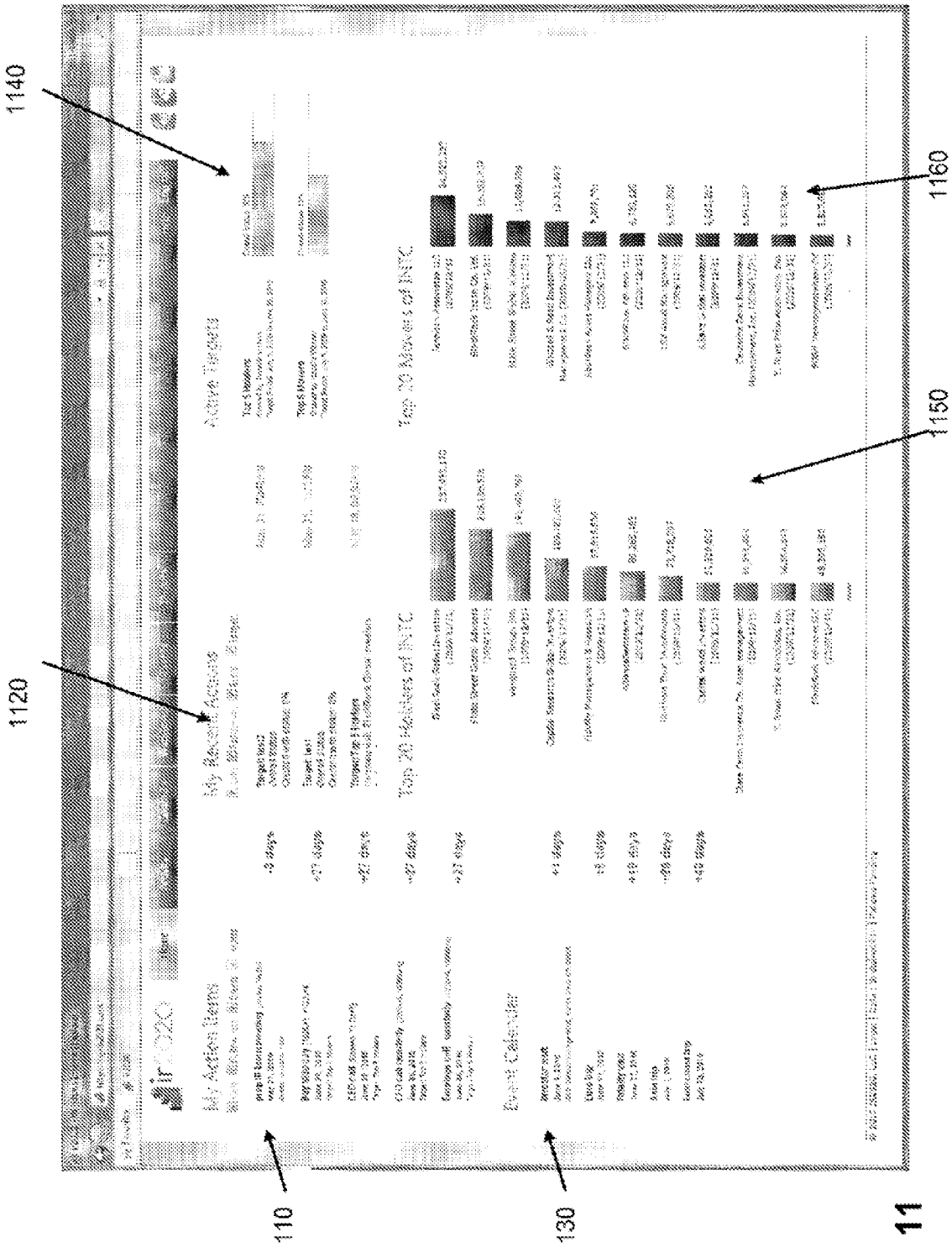
FIG. 11 illustrates an exemplary user interface for a home page

FIG. 11 illustrates an exemplary home page 1100. Task management functions are shown in with filters on pending action items 1110 and completed actions 1120. Scheduled events are shown in 1130. For target management an active target widget 1140 shows the percent holding of the top five holders and the top five movers. Top twenty holders of Intel Corp. ("INTC") by volume are shown in 1150 and top twenty movers by volume are shown in 1160.

Figure 12:
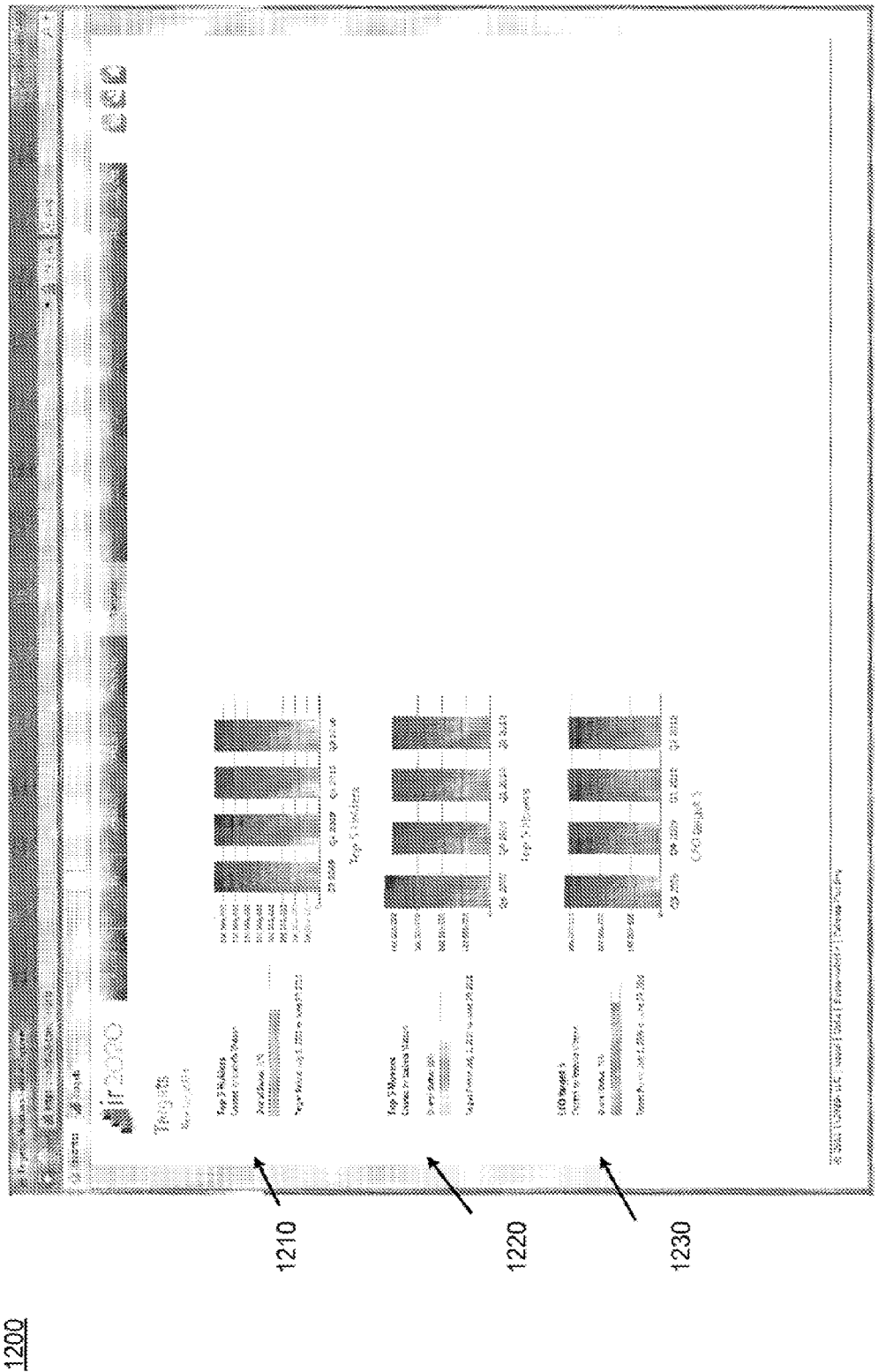
FIG. 12 illustrates a sample target summary page.

A home page is intended only to show top level information to an IRO. Summary sub pages may be accessible from the home page. FIG. 12 illustrates an exemplary target summary page 1200. FIG. 12 shows target holding data over time for top holders 1210, top movers 1220. The data need not be shown as a time series. However the target data may be based on an arbitrary query 1230 as opposed to strictly data regarding holders, movers or some other predefined set.

Figure 13:
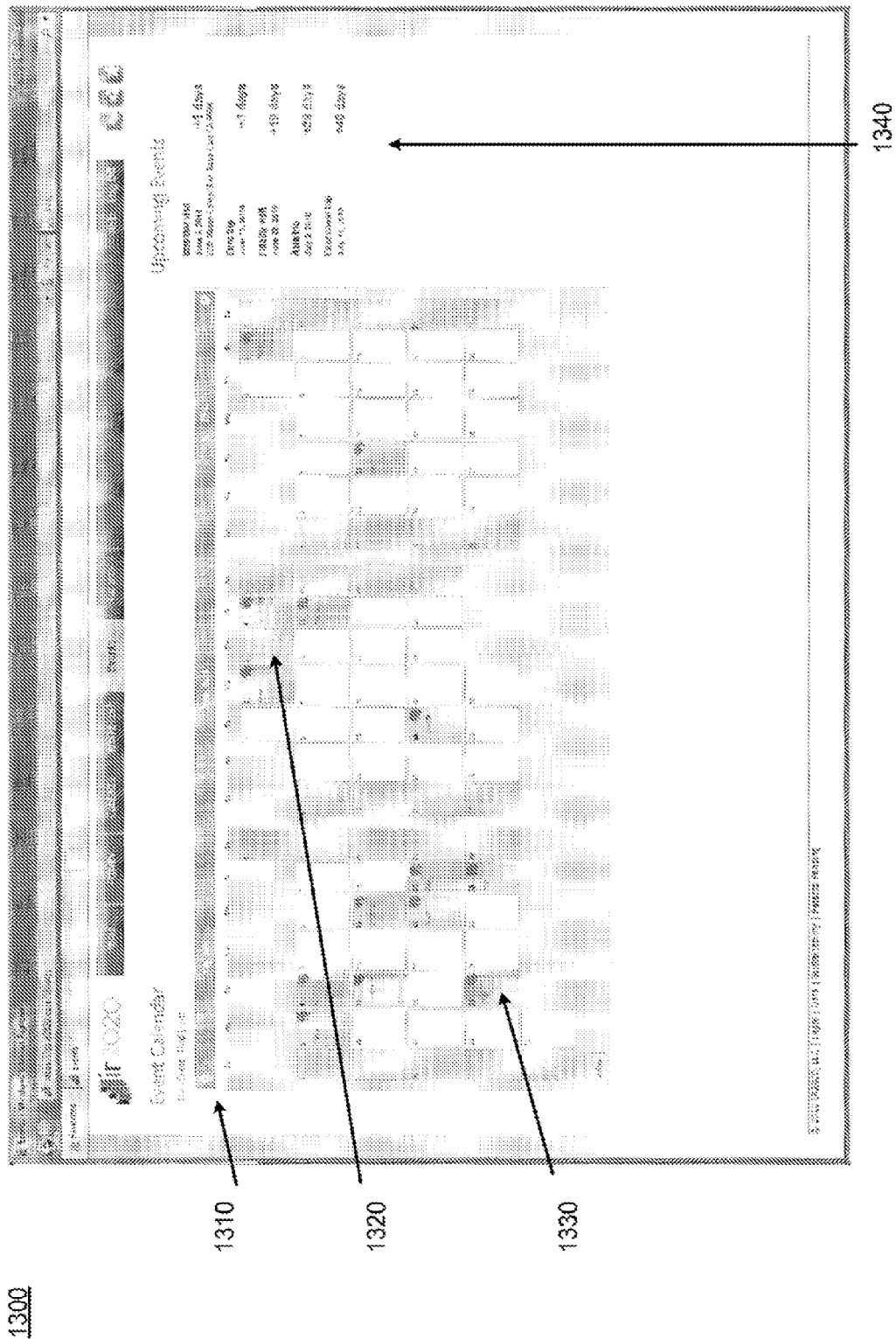
FIG. 13 illustrates a sample event summary page.

Another example summary page accessible from the home page would be an event summary page. FIG. 13 illustrates an exemplary event summary page 1300. Event calendar widget 1310 is presently shown as a three month view. The view alternatively may be of a single month or some other arbitrary time frame. The current date 1320, (here Jun. 3, 2010) is highlighted in yellow. Days corresponding to events and activities 1330 are shown in blue with a red pushpin indicating a pending activity. A linear list of upcoming events is shown in 1340.

b. Contact Target and Event Management

By augmenting CRM data and investor holding data, an IRO may manage contacts, events and target lists.

A contact may be searched for potentially by name, by institution or by fund. Alternatively a contact may be searched for by recent changes in holding or by pending activities. A contact report may include not only name and institution, but also address information. It is to be noted that a contact's address is not necessarily the same as the headquarters of the institution. Accordingly, where a contact report is used in support of developing an itinerary, the contact's address rather than that of the headquarters is used.

Figure 14:
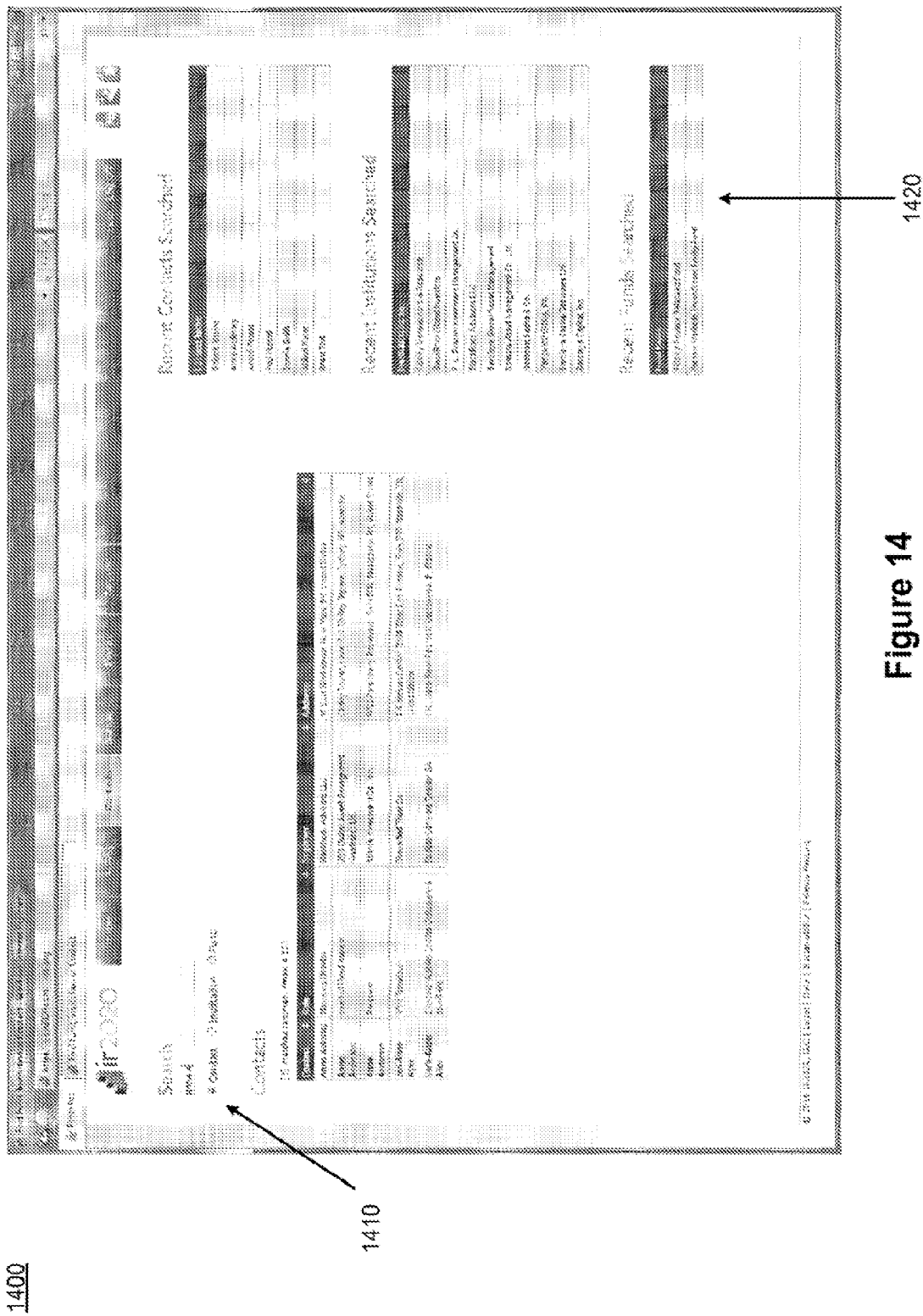
FIG. 14 illustrates an exemplary contacts search form.

FIG. 14 illustrates an exemplary contact management search form. Search box 1410 provides for search by contact name, institution or fund. Queries may be cached and recalled via web links enumerated in lists of recent contact, recent institution and recent fund searches 1420.

Combining the contact information with activity data may create a target management report. Specifically, for a list of investors that satisfy a query, a target management report may list the investment relations activities associated with the contact, the respective locations of those activities, the respective identities of persons responsible for those activities and the respective statuses. Based on this status, the IRO may determine whether or not follow-up with the contact is necessary.

An event is a conceptual grouping of one or more meetings respectively with one or more contacts. An event may be a single meeting with one or more contacts. Alternatively, an event may be a multi-destination event where multiple meetings are conceptually grouped as part of the same event.

An event management report may be generated to help manage events. Specifically, given a list of contacts, an itinerary of investment relations meetings may be generated. The itinerary will identify the contacts, the locations and a snapshot status of the investor relations with those contacts. The snapshot status may include the investment holding or movement of the contact, a history of calls or other communications with the contact and a status on follow-up items with the investors.

c. Activity Management

A particularly novel set of reports disclosed herein are investor relations activity management reports. Investor relations activity management reports may show the status of particular activities. When combined with holdings data, correlations between investor relations activities and changes in holdings may be made. In this way, an IRO or a sponsor may evaluate the effectiveness of various activities on investor relations.

Accordingly, a base investor relation activity report may comprise a list of activity records against contacts, where each record identifies an activity, the contact the activity is performed on and a status of the activity. The status may be complete, pending, or may be a text note. The activity records may be grouped by various attributes including, but not limited to activity type.

The activity management report may be filtered on a particular contact, or may be filtered on a predetermined set of contacts. For example, if a set includes Joe Smith, Mary Johnson, and John Doe, then all the activities corresponding to those three contacts are returned. Similarly, an activity report may be filtered by the result of a query. For example, if a query were to be expressed that returned contacts Joe Smith, Mary Johnson, and John Doe, then all the activities corresponding to those three contacts, by virtue of being expressed in a resultset are returned.

Figure 15:
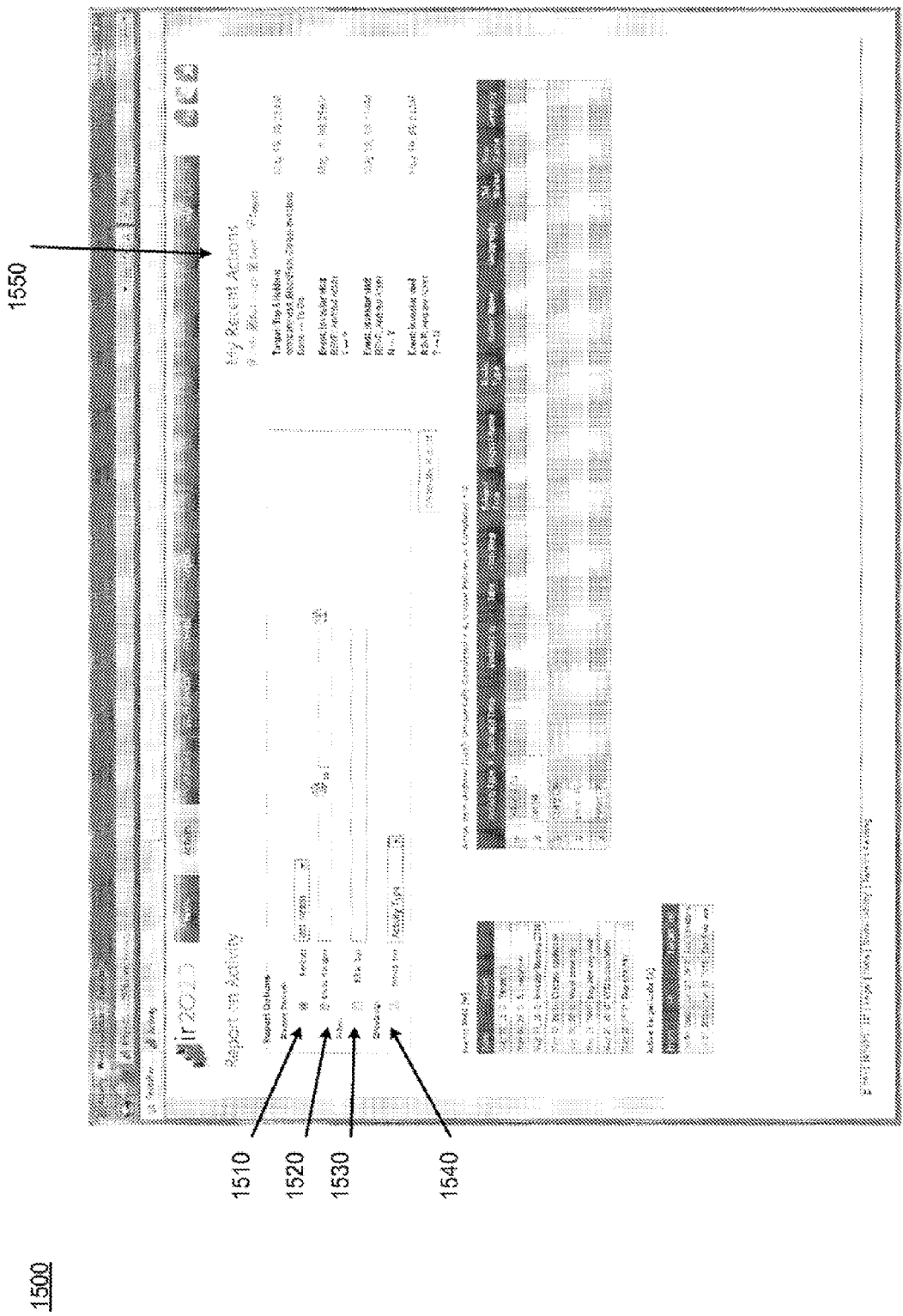
FIG. 15 illustrates an exemplary activity search form.

FIG. 15 illustrates an exemplary activity query form 1500. A predefined date range of activities may be selected from a drop down box 1510, or alternatively a custom date range specified. Calendar controls combined with text boxes 1520 enable a clickable selection of dates. Filters may be specified by clicking on the filter check box 1530 and filter criteria entered into the associated text box. The generated report may have activity records grouped by predefined fields by selecting group by check box 1540. Here "Activity Type" is the selected group by value. A separate "My Recent Actions" 1550 can provide a linear list of recently performed activities. Depending on the check boxes selected, the retrieved activities may be filtered by calls, follow-ups, events or targets.

Since the activity management report may access the locations of activities performed, the activity data may be superimposed on a map. For example, a point may correspond to a discrete activity or event on the map. The points may be displayed as a time series where a slider control or equivalent widget is used to show activity according to time. Alternatively, different color may be used to show time series of data.

As an alternative to time series of data, color may be used to show some assessment of an activity. Specifically, a table of activities sorted by institution or fund may be generated from a query resultset. Based on predefined criteria, cells in the table may be color coded to indicate outliers. For example, a red cell may highlight a value indicating a potential problem, but a green cell may indicate a desirable value.

Alternatively, since activities are associated with geographic locations, the data in the table may be geographically mapped as well. Gradients based on the density of activities may be superimposed over the map. The gradients may then be color mapped. For example, a high density of activity may be illustrated as red and a low density of activity may be illustrated as blue. In this way, an IRO or sponsor might see where the focus of activities is geographically located.

A geographic mapping of activity data may be further augmenting by superimposing the locations of contacts. For example, the locations of the top ten holders of a company may be superimposed over the geographic mapping of activity data. An IRO or sponsor might expect that the greatest density of activity should be around the locations of the top ten holders. In this way, an IRO or sponsor may assess the comprehensiveness of an investor relations program. As mentioned above, by tracking the actual address locations of the contacts as opposed to the headquarters of the contact's respective institution, activity far from an institution's headquarters can be made discoverable to a sponsor.

Another example would be to superimpose the locations of the top ten movers of a company. Again, an IRO or sponsor might expect the greatest density of activity to be located around those movers. In this way, an IRO or sponsor may assess a return on the investment on the expense of those activities.

d. Reports Based on User State Information

An investor relations system may include a client side application. If the client side application is hosted on a client that provides user state information enables a different class of reports. An example of user state information is the identity of the user, the present date time stamp, and the geolocation of the user. User state information is available on mobile phones and on some netbooks where a geographic positioning system ("GPS") receiver or other geolocation locator is available.

An example of an application making use of user state information is retrieving contact information for the next event in an IRO's itinerary, Consider an IRO on travel in between events. If an IRO has just finished a first investment presentation and is about to go to a second investment presentation, the IRO may consult a mobile phone application to access the investor relations system to retrieve contact information for the next event. Specifically, the mobile phone application may take the user identifier and date time stamp to determine the next scheduled event. The investor relations system may then retrieve snapshots of investors attending the next scheduled event. The IRO may then browse this information at will.

User state information also includes geolocation information. An example of an application making use of geolocation is obtaining directions to the next event, in the example above of an IRO on travel in between events the IRO may consult a mobile phone application for directions to the next event. Specifically, the mobile phone application may determine the next scheduled event as described above. From the user's geolocation, the mobile phone application may access street map data and access directions to the next scheduled event from a web service.

Some clients support date time stamps but not geolocation. For example a laptop may not support geolocation but may support date time stamp. A mobile application may be configured to provide the functionality based on the user state information available.

Exemplary Investor Relations Services

The investor relations system may support different types of server side applications including, but not limited to transactional applications, data mining applications and workflow applications. An example of a transactional application might be a contact management form where an IRO may enter data on a new contact for an institution. An example of a data mining application might be the activity report described above where a sponsor reviews correlations between activities and holders. An example of a workflow application might be a target management application where multiple IROs perform multiple activities in to prioritize communication with a contact.

Figure 16:
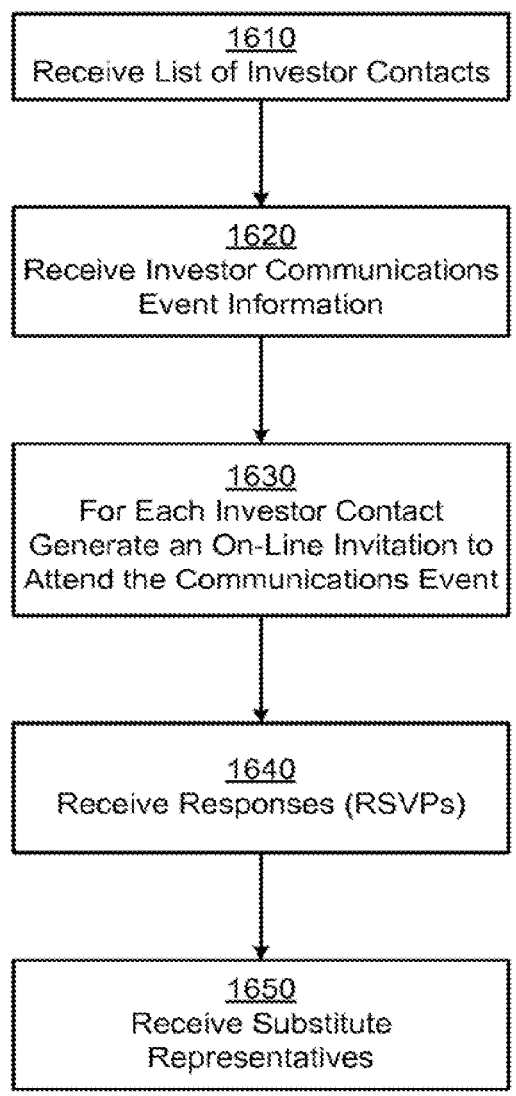
FIG. 16 is a flow chart of an exemplary investor relations invitation service.

The investor relations system is not limited to database services, but may make use of any server side service as infrastructure for server side investor relations applications. An example service that makes use of electronic mail ("e-mail") services might be an automated event invitation system. FIG. 16 illustrates an exemplary flow chart 1600 of an automated event invitation system.

In step 1610, the event invitation system receives a list of investor contacts that have been identified as targets for an event. The list of investor contacts may be in the form of a static, predetermined list or alternatively in the form of a query resultset.

An event may be at a single time and location or may be at multiple times and multiple locations. The availability of venue and presenters determine constraints of when and where an event may be. In step 1620, an IRO may enter event information comprising the times and locations of events. Optionally, the event invitation system may correlate these times and locations to ensure all the investor contacts identified in step 1610 are covered and are proximate to the event. Note that the event invitation system should take into account that the address of a contact may not be the same as the address for an institution.

Once all the investor contacts are covered, in step 1630 the event invitation system automatically generates an e-mail event form. Note that the event forms may be generated either server side or client side. The form includes user interface features such as acceptance buttons to allow a recipient to easily reply ("RSVP"). The form may include fields for comments, requests, questions, or substitute attendees. The forms are queued before being e-mailed to allow an IRO to customize the invitation. After customization, an IRO e-mails out the forms.

In step 1640, the event invitation system receives RSVPs from the invited investor contacts.

In step 1650, an investor contact may designate a substitute representative. In this case, the event invitation system may verify that the substitute representative's contact information is in the system. If not, an action item to obtain this information may be sent to an IRO. Additionally the event invitation system may prompt the IRO to determine whether or not the substitute is acceptable.

At any point in time, the event invitation system may be queried for a list of invited contacts who have accepted, a list of invited contacts who have not responded, and a list of invited contacts who have declined. In the last two cases, the event invitation system may generate action items for an IRO to follow-up personally with the contact. The acceptances may also be reviewed to determine if any questions or requests were made in the response to the invitation.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Appendix

Exemplary BNF for an Investor Relations Intermediate Language

```
<holderquery> ::=     for <holderset>
                      get ( <stockdatalist> | fundamentals )
<holderset> ::=       <holderpredicate>
                      [(which are [not] also | together with)
                      <holderset>]
<holderpredicate> ::= <holderholdingpredicate>
                      [[with] <holderattributepredicate>] | (
```

Appendix-continued

Exemplary BNF for an Investor Relations Intermediate Language

```
                              <holderset> )
<holderattributepredicate> ::= <holderattributeclause>
                              [(and|or) <holderattributepredicate>]
<holderattributeclause>   ::= [<holderattribute> <operator>]
                              <value> [<timeframespec>] |
                              ( <holderattributepredicate> )
<holderholdingpredicate> ::= (top | bottom) <count>
                              (mutual fund | institution)
                              <holdingdisposition> of [stock with]
                              <stockpredicate>
                              [<timeframespec>] | mutual funds |
                              institutions | holders
<stockpredicate> ::=          <stockclause> [(and | or) <stockpredicate>]
<stockclause> ::=             [<stockattribute> <operator>] <value> |
                              ( <stockpredicate> )
<stockdatalist> ::= <stockdataspec> [ , <stockdatalist> ]
<stockdataspec> ::= holding of [stock with]
                              <stockpredicate> [<timeframespec>]
                              [with weighting over
                              <weightingstockpredicatelist>
                              compared to (<holderset> | market) ]
<weightingstockpredicatelist> ::= [stock with] <stockpredicate>
                              [and over <weightingstockpredicatelist>]
<value> ::= <singlevalue> [ , <value>]
<singlevalue> ::=       // Any token not a keyword,
                        // operator or tokenstopchar
<timeframespec> ::= == (as at | before | after) <datespec> |
                        [anytime] during <datespec> to <datespec>
<datespec> ::= now | yyyymm | earliestdate
<holderattribute>       ::= name | street1 | city | state |
                        postalcode | country.countryname | parent |
                        style | assetsundermanagement | aum | indexfund |
                        holderid | country.region.regionname |
                        state1.statename | entitytype2 | portfoliovalue |
                        turnover | peratio | pbratio | dividendyield |
                        salesgrowth | pricemomentum | relativestrength |
                        beta
<holdingdisposition> ::= holders | nonholders | shortholders |
                        movers | buyers | sellers |
                        %holders | %movers | %buyers | %sellers
<stockattribute>        ::= symbol | P/E | category | sector | index |
                        memberofsp500 | address | name | cusip |
                        tickersymbol
<operator> ::=          = | != | > | >= | < | <= | in | contains
End of BNF example.
```

We claim:

1. A method of retrieving data from a data store according to a user intent, the method comprising:
   receiving a query in an intermediate language, the intermediate language specific to a vertical domain, the query comprising multiple query terms from a user expressing the user's intent, the multiple query terms associated with the vertical domain;
   selecting a parser from a plurality of parsers, the parser configured to support the multiple query terms associated with the vertical domain;
   parsing the intermediate language query into the multiple query terms using the parser; and
   converting the multiple query terms to a data retrieval language query using a processor, the data retrieval language query having data retrieval terms specific to retrieving data from the data store, the data retrieval terms configured to operate directly against the data store.

2. The method of claim 1, wherein the vertical domain of the intermediate language is that of investor relations.

3. The method of claim 1 wherein, the query terms of the intermediate language query include one or more of: fund data definition, stock data definition, and holding data definition.

4. The method of claim 3, wherein the query terms of the intermediate language query include weighting directives.

5. The method of claim 1, the further comprising:

executing the data retrieval language query to retrieve query results from the data store, the retrieved query results having been pre-processed by: data compression, indexing, or hashing.

6. The method of claim 1, wherein the receiving the intermediate language query comprises:

displaying a graphical user interface comprising one or more input options for expressing the user's intent;

receiving user input via the graphical user interface, the user input expressing the user's intent; and generating the intermediate language query.

7. The method of claim 6, wherein one of the editable options is an option associated with an institution; and wherein generating the intermediate language query comprises:

retrieving attributes and attribute values of the institution whose associated option has been selected as part of the received user input, and generating intermediate language clauses to retrieve institutions with substantially the same attribute values retrieved for the institution.

* * * * *